(12) United States Patent
Yamamoto et al.

(10) Patent No.: US 11,034,022 B2
(45) Date of Patent: Jun. 15, 2021

(54) ROBOT TEACHING SYSTEM, CONTROLLER AND HAND GUIDE UNIT

(71) Applicant: FANUC CORPORATION, Yamanashi (JP)

(72) Inventors: Tomoyuki Yamamoto, Yamanashi (JP); Nao Ooshima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 241 days.

(21) Appl. No.: 16/197,358

(22) Filed: Nov. 21, 2018

(65) Prior Publication Data

US 2019/0160672 A1    May 30, 2019

(30) Foreign Application Priority Data

Nov. 28, 2017    (JP) .............................. JP2017-227540

(51) Int. Cl.
| | | |
|---|---|---|
| *B25J 9/16* | (2006.01) | |
| *G05B 19/42* | (2006.01) | |
| *B25J 13/02* | (2006.01) | |
| *G05B 19/427* | (2006.01) | |

(52) U.S. Cl.
CPC ........... *B25J 9/1664* (2013.01); *B25J 9/1689* (2013.01); *B25J 13/02* (2013.01); *G05B 19/42* (2013.01); *G05B 19/427* (2013.01); *G05B 2219/33192* (2013.01); *G05B 2219/39439* (2013.01)

(58) Field of Classification Search
CPC ........ B25J 9/1664; B25J 9/1689; G05B 19/42
USPC ......................................................... 700/245
See application file for complete search history.

(56) References Cited

U.S. PATENT DOCUMENTS

| | | | |
|---|---|---|---|
| 9,138,895 B2 * | 9/2015 | Melikian | B25J 19/023 |
| 2010/0145520 A1 | 6/2010 | Gerio et al. | |
| 2017/0028549 A1 | 2/2017 | Battisti | |
| 2017/0028557 A1 * | 2/2017 | Battisti | B25J 9/1684 |
| 2017/0259433 A1 * | 9/2017 | Takeuchi | B25J 9/1633 |

FOREIGN PATENT DOCUMENTS

| | | | |
|---|---|---|---|
| JP | H9-16260 | A | 1/1997 |
| JP | 2009-6465 | A | 1/2009 |
| JP | 2009028893 | A | 2/2009 |
| JP | 2009119579 | A | 6/2009 |
| JP | 2010-149273 | A | 7/2010 |
| JP | 2011189431 | A | 9/2011 |
| JP | 2014117783 | A | 6/2014 |

* cited by examiner

*Primary Examiner* — Khoi H Tran
*Assistant Examiner* — Rodney P King
(74) *Attorney, Agent, or Firm* — Hauptman Ham, LLP

(57) ABSTRACT

A robot teaching system includes a hand guide unit including a stick for use in a teaching operation of a robot, and a wireless communication unit configured to communicate by radio with a teach pendant; a relative position setting unit configured to set relative position information between the hand guide unit and the robot; and a coordinate calculation unit configured to calculate, based on the relative position information, coordinates having as an origin a flange surface of the robot or a distal end point of a tool attached to the robot, in such a manner as to correspond to an operation direction of the stick.

6 Claims, 8 Drawing Sheets

ROBOT TEACHING SYSTEM, CONTROLLER AND HAND GUIDE UNIT

RELATED APPLICATIONS

The present application claims priority of Japanese Application Number 2017-227540, filed on Nov. 28, 2017, the disclosure of which is hereby incorporated by reference herein in its entirety.

BACKGROUND OF THE INVENTION

1. Field of the Invention

The present invention relates to a robot teaching system, a controller and a hand guide unit.

2. Description of the Related Art

At a time of a teaching operation or a jog operation of a robot, a human applies force to a stick or the like of a hand guide unit which is attached to the robot, and moves the robot in the direction of the force, thereby moving the robot in a desired direction. A method of guiding the robot in this manner is called "hand guide", "direct teach", "lead-through", etc., and this method enables more intuitive teaching of the robot.

In order to detect the direction of force, there is a case in which a force sensor is assembled in the hand guide unit, or a case in which a torque sensor is assembled in a motor of each axis of the robot. By using such a hand guide unit, an operator moves the robot to a desired position in a desired direction, so as to perform teaching of position to the robot. In addition, such work is repeated to teach the locus of the robot. In general, it is inconvenient to attach the hand guide unit to the robot, and the handling of the hand guide unit itself is difficult. Moreover, it is time-consuming to connect the hand guide unit to a controller of the robot or a teach pendant.

This being the case, a hand guide unit, which can be switchedly attached to other robots or can wirelessly communicate with a teach pendant, has been proposed. Refer to, for example, Japanese Unexamined Patent Publication (Kokai) No. 2010-149273. Japanese Unexamined Patent Publication (Kokai) No. 2010-149273 discloses a hand guide unit called a "guide device".

SUMMARY OF INVENTION

However, since the operator performs a teaching operation or a jog operation while being close to the robot, there is a case in which the safety of the operator is difficult to secure, depending on the movement of the robot. In order to secure the operator's safety, it is desired that the hand guide unit be detached from the robot, and the operator perform a teaching operation or the like from a sufficiently distant position from the robot.

Furthermore, when the operator performs a teaching operation or the like in the state in which the hand guide unit is detached from the robot, there is a case in which the coordinate axes of the hand guide unit are not identical to the coordinate axes of the robot. In this case, if the operator performs a teaching operation by using the hand guide unit, it is possible that the robot moves in a direction which is not intended by the operator.

Even when the hand guide unit is attached to the robot, there is a case in which, depending on the shape of a tool of the robot, a tool distal end point is distant from a flange surface existing at the distal end of the robot. In such a case, it may become difficult to perform an operation in which the tool distal end point is used as reference.

Therefore, there is a demand for a robot teaching system which can exactly move the robot in a desired direction, while securing the operator's safety.

According to a first aspect of the disclosure, there is provided a robot teaching system including a hand guide unit including a stick for use in a teaching operation of a robot, and a wireless communication unit configured to communicate by radio with a controller which controls the robot, or with a teach pendant; a relative position setting unit configured to set relative position information between the hand guide unit and the robot; and a coordinate calculation unit configured to calculate, based on the relative position information, coordinates having as an origin a flange surface of the robot or coordinates having as an origin a distal end point of a tool attached to the robot, in such a manner as to correspond to an operation direction of the stick.

In the first aspect, based on the relative position information, the coordinates are set in such a manner as to correspond to the operation direction of the stick. Accordingly, the robot moves in accordance with the operation direction in which the operator operates the stick. Thus, even when the hand guide unit is detached from the robot, the teaching operation can be performed by radio, while the operator's safety is secured.

The object, features and advantageous effects of the present invention will be made clearer by the description of embodiments below, which are associated with the accompanying drawings.

DETAILED DESCRIPTION

Figure 1:
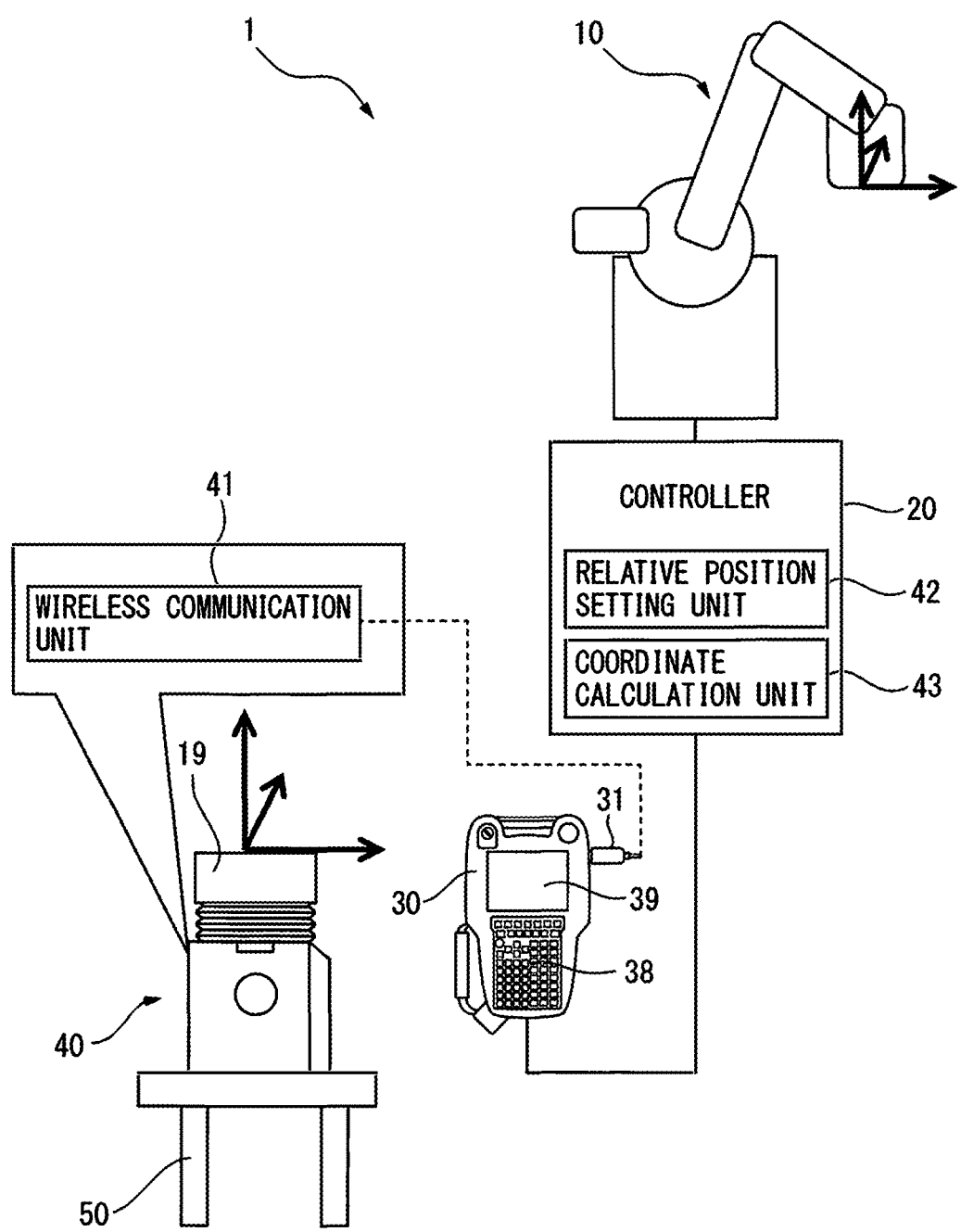
FIG. 1 is a conceptual view of a robot teaching system including a hand guide unit based on a first embodiment.

Hereinafter embodiments of the present invention will be described with reference to the accompanying drawings. Common structural elements are denoted by like reference numerals throughout the drawings.

FIG. 1 is a conceptual view of a robot teaching system including a hand guide unit based on a first embodiment. The robot teaching system 1 in the first embodiment mainly includes a robot 10, a controller 20 which controls the robot 10, a teach pendant 30 connected to the controller 20, and a hand guide unit 40.

The robot 10 is an articulated robot, and has a plurality of axes, for example, six axes. The robot 10 may be a robot which performs a collaborative work by sharing a work space with an operator (a human, not illustrated in FIG. 1).

The controller 20 is a digital computer including a CPU, a memory, etc., which are interconnected via a bus or the like. The teach pendant 30 is connected to the controller 20. The teach pendant 30 is, in general, used for a teaching operation of the robot 10, and performs manual jog feed of each axis of the robot 10 by the operator's operation. The teach pendant 30 may be a digital computer including a CPU, a memory, etc., which are interconnected via a bus or the like.

Figure 2:
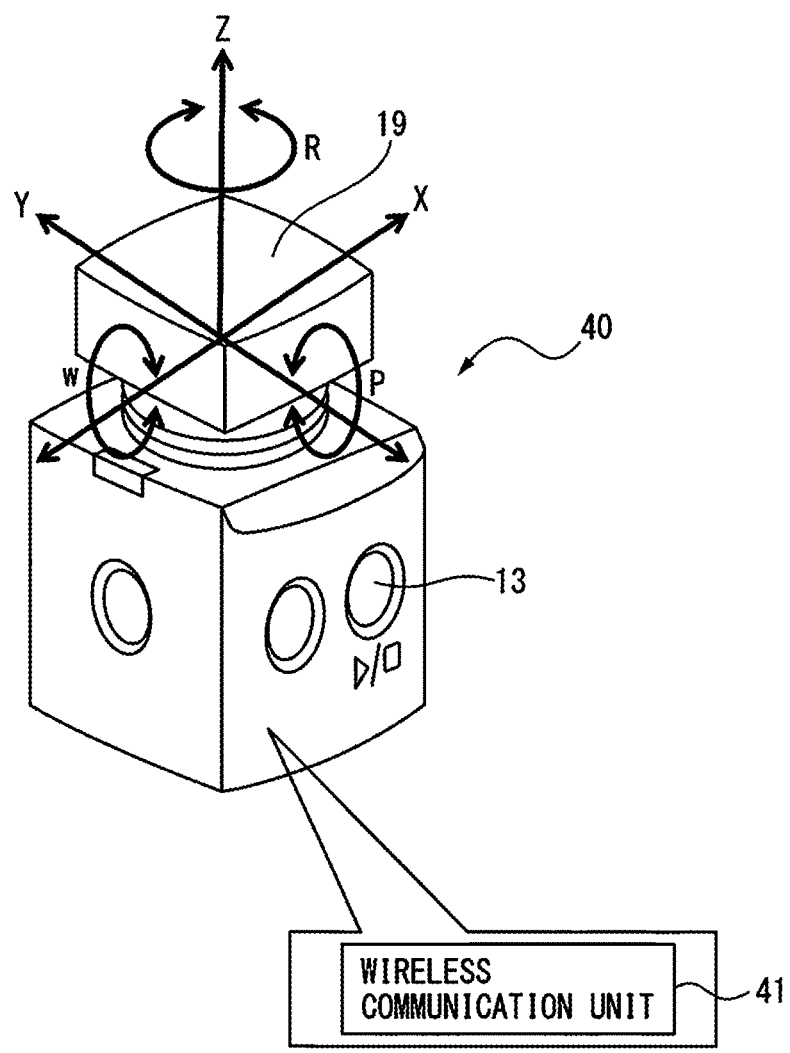
FIG. 2 is a perspective view of the hand guide unit.

The hand guide unit 40 is installed on a table 50 at a location remote from the robot 10. FIG. 2 is a perspective view of the hand guide unit. The hand guide unit is a kind of small-sized computer, and may include a CPU and a memory. A stick 19, for example, a joystick, which is used for a teaching operation of the robot, is provided on a top surface of the hand guide unit 40. The stick 19 can be moved along an X axis, a Y axis and a Z axis and rotated in a W direction, a P direction and an R direction by an operator, for example, a human 11 (see FIG. 5). By the stick 19 being operated in this manner, the robot 11 is moved in accordance with the operation direction of the stick 19.

A switch 13 is provided on a side surface of the hand guide unit 40. The operator, when performing a teaching operation, operates the stick 19 as described above, while pressing the switch 13. While the switch 13 is being pressed, the teaching operation can be performed. When the switch 13 is not pressed, the teaching operation cannot be performed. Note that the teaching operation may be enabled even when the switch 13 is not continuously pressed, for example, such that the teaching operation is enabled by pressing the switch 13, and the teaching operation is disabled by pressing the switch 13 once again.

Referring to FIG. 1, the hand guide unit 40 includes a wireless communication unit 41 which communicates by radio with the teach pendant 30. In order to communicate with the wireless communication unit 41, a wireless dongle 31 is connected to the teach pendant 30. Note that the wireless communication unit 41 may be wirelessly communicable with the controller 20.

In general, the teach pendant 30 is connected by wire to the controller 20. Since the hand guide unit 40 is connected by radio to the teach pendant 30, the operator can perform a teaching operation or the like through the teach pendant 30 by operating the hand guide unit 40.

Figure 3A:
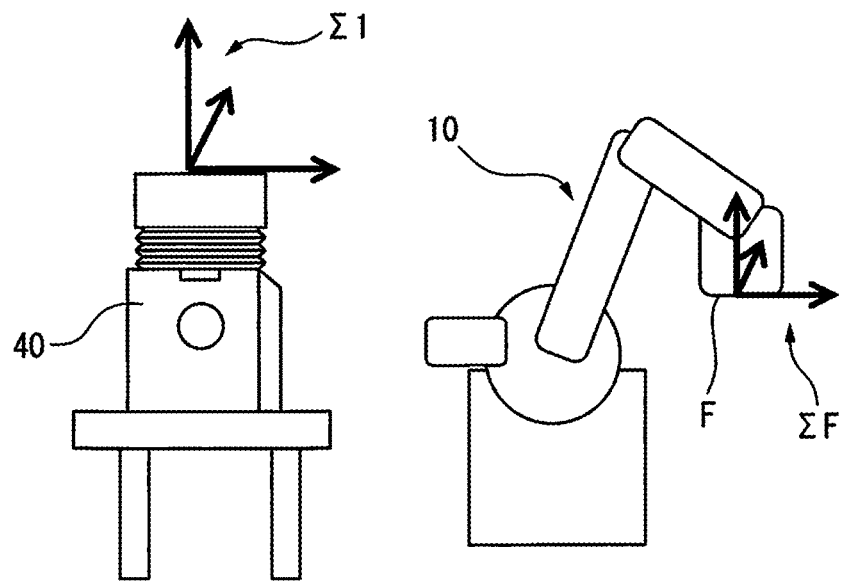
FIG. 3A is a first view of a robot and the hand guide unit.
Figure 3B:
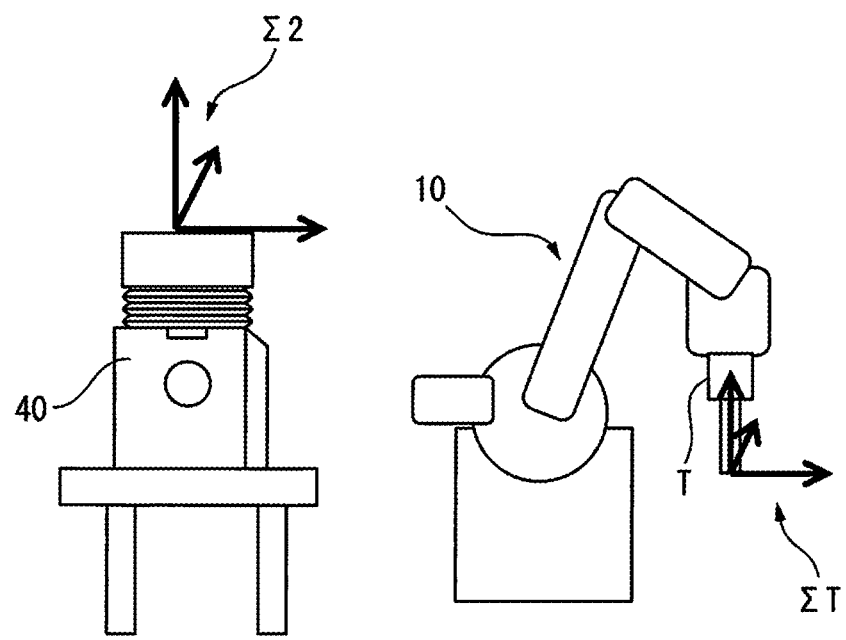
FIG. 3B is a second view of the robot and the hand guide unit.

Besides, the controller 20 includes a relative position setting unit 42 which sets relative position information between the hand guide unit 40 and robot 10. The position where the robot 10 is installed is grasped in advance, and stored in the teach pendant 30 or the controller 20. The relative position information, which is set in the relative position setting unit 42, is input by the operator by using the teach pendant 30. The relative position information may be input by other methods. For example, the operator may input the relative position by using another button (not illustrated) provided on the hand guide unit 40. Besides, for example, the absolute position of the hand guide unit 40 may be detected by using a relative position detection means (not illustrated) which is provided in the hand guide unit 40 and has a GPS (Global Positioning System) function, and the relative position may be set based on the absolute position of the hand guide unit 40. The controller 20 further includes a coordinate calculation unit 43 which calculates, based on the relative position information, coordinates having as an origin a flange surface of the robot 10 or coordinates having as an origin a distal end point of a tool T attached to the robot 10, in such a manner as to correspond to an operation direction of the stick 19. The CPU of the controller 20 functions as the relative position setting unit 42 and the coordinate calculation unit 43. FIG. 3A and FIG. 3B are views of the robot and the hand guide unit. In FIG. 3A, coordinates $\Sigma F$ having as an origin the center of a flange surface F, which is located at an arm distal end of the robot 10, are set by the coordinate calculation unit 43. In FIG. 3B, coordinates $\Sigma T$ having as an origin the distal end point of the tool T attached to the robot 10, are set by the coordinate calculation unit 43.

Figure 3C:
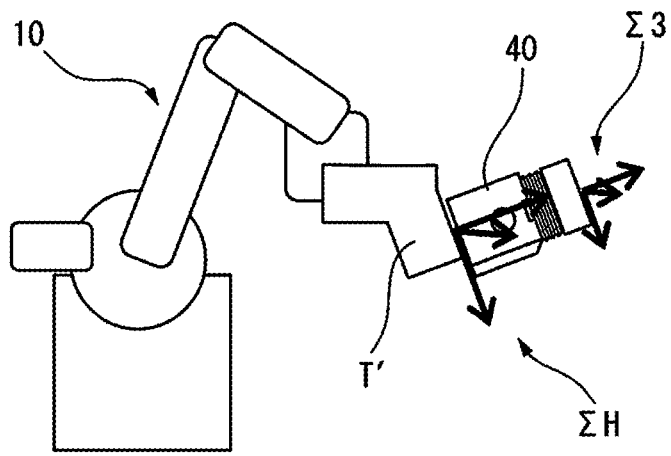
FIG. 3C is a third view of the robot and the hand guide unit.

The tool T illustrated in FIG. 3B has a simple, substantially cylindrical shape. In FIG. 3C which is similar to FIG. 3A and FIG. 3B, a tool T' having a complex, three-dimensionally curved shape is attached to the distal end of the robot 10. A distal end point of the tool T' is distant from the flange surface. Thus, the coordinate calculation unit 43 calculates, based on the position information of the hand guide unit 40, coordinates $\Sigma H$ having the hand guide unit 40 as an origin. Note that the position information of the hand guide unit 40 corresponds to the position of the hand guide unit 40.

Figure 4:
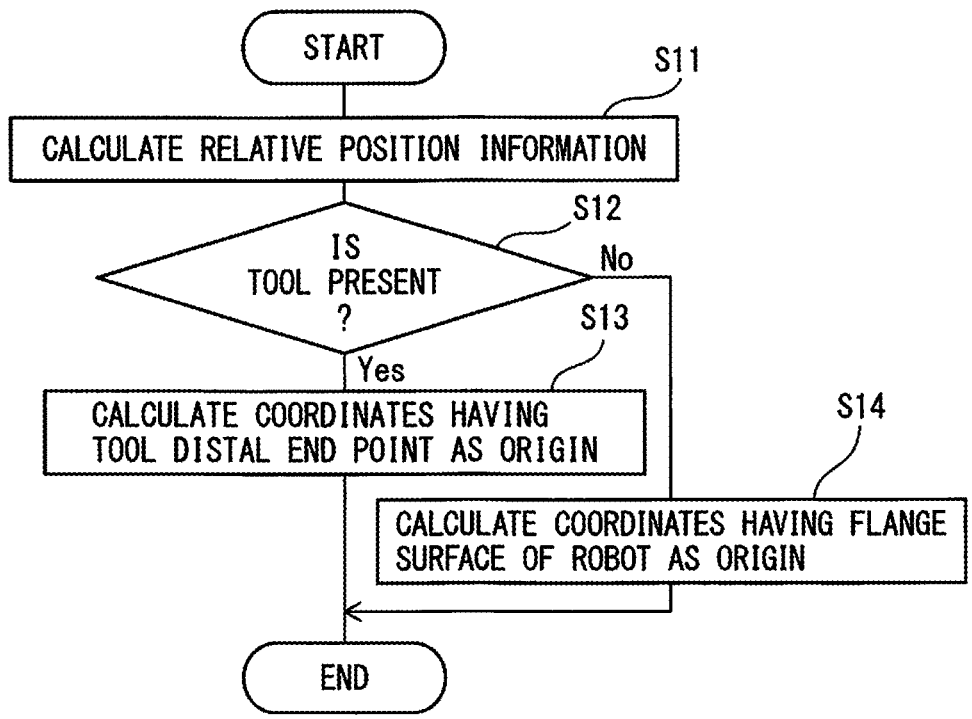
FIG. 4 is a flowchart illustrating an operation of the robot teaching system in the first embodiment.

FIG. 4 is a flowchart illustrating an operation of the robot teaching system in the first embodiment. The process illustrated in FIG. 4 is executed when the hand guide unit 40 is located remote from the robot 10, for example, when the hand guide unit 40 is installed on the table 50 which is remote from the robot 10, as illustrated in FIG. 3A, etc. Further, it is assumed that the wireless communication unit 41 is in such a state as to be wirelessly communicable with the teach pendant 30 or the controller 20.

To start with, in step S11, the relative position setting unit 42 sets relative position information between the hand guide unit 40 and robot 10.

Then, in step S12, it is judged whether the tool T is attached to the arm distal end of the robot 10. The judgment of the presence/absence of the tool T may be executed through a weight scale (not illustrated) which measures the weight of the robot 10. Alternatively, the operator may input the presence/absence of the tool T by using another button (not illustrated) of the hand guide unit 40 or by using the teach pendant 30.

When the tool T is attached to the robot 10, the coordinate calculation unit 43 calculates the coordinates $\Sigma T$ having as the origin the distal end point of the tool T, as described with reference to FIG. 3B (step S13). When the tool T is not attached to the robot 10, the coordinate calculation unit 43 calculates the coordinates $\Sigma F$ having the flange surface F as the origin, as described with reference to FIG. 3A.

The coordinates $\Sigma T$, $\Sigma F$ correspond to coordinates $\Sigma 1$, $\Sigma 2$ of the hand guide unit 40. In other words, the coordinates $\Sigma T$, $\Sigma F$ correspond to the direction of installation of the hand guide unit 40. Thus, in the first embodiment, in the coordinates $\Sigma T$, $\Sigma F$ which are set based on the relative position information, the operation direction of the stick 19 in the coordinates $\Sigma 1$, $\Sigma 2$ is reflected so as to become the same direction. Accordingly, when the operator performs teaching or the like of the robot 10 by the hand guide unit 40, the robot 10 moves in accordance with the operation direction in which the operator operates the stick 19. Thus, even when the hand guide unit 40 is located remote from the robot 10, or even when the hand guide unit 40 is detached from the robot 10, the teaching operation can be performed by the wireless communication unit 41, while the operator's safety is secured.

Figure 5:
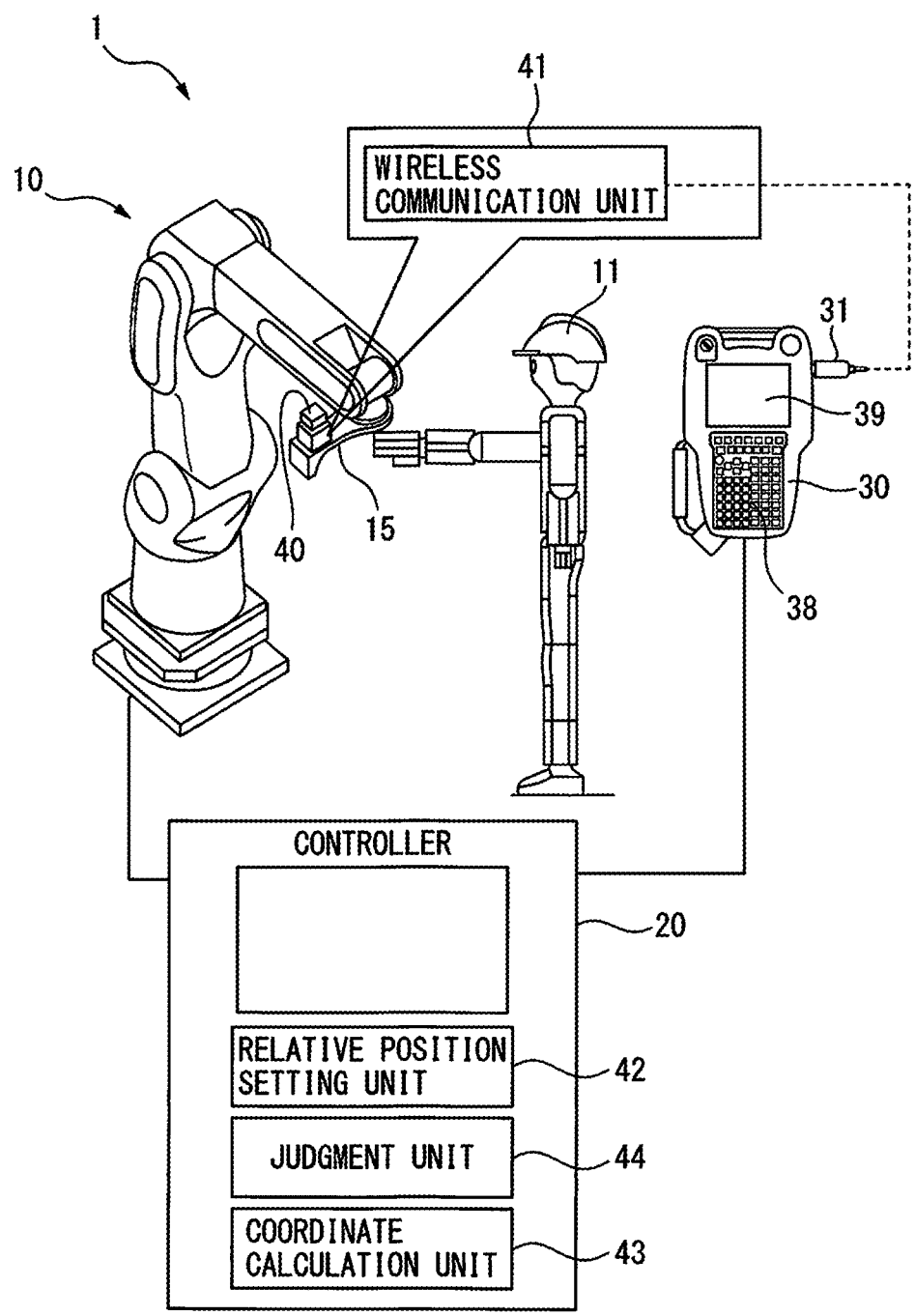
FIG. 5 is a conceptual view of a robot teaching system including a hand guide unit based on a second embodiment.

FIG. 5 is a conceptual view of a robot teaching system including a hand guide unit based on a second embodiment. In the second embodiment, a bracket 15 is attached to the arm of the robot 10. In addition, the hand guide unit 40 is attached to the bracket 15 of the robot 10. Moreover, the controller 20 includes a judgment unit 44 which judges, based on the relative position information, whether the hand guide unit 40 is attached to the robot 10. Based on the amount of movement in each axis of the robot 10, the judgment unit 44 may create a model of the robot, which corresponds to the present position and orientation of the robot 10. Then, based on the relative position information and/or the model, the judgment unit 44 executes the above-described judgment. The CPU of the controller 20 functions as the judgment unit 44. The other elements are the same as described above, and an overlapping description is omitted.

Figure 6:
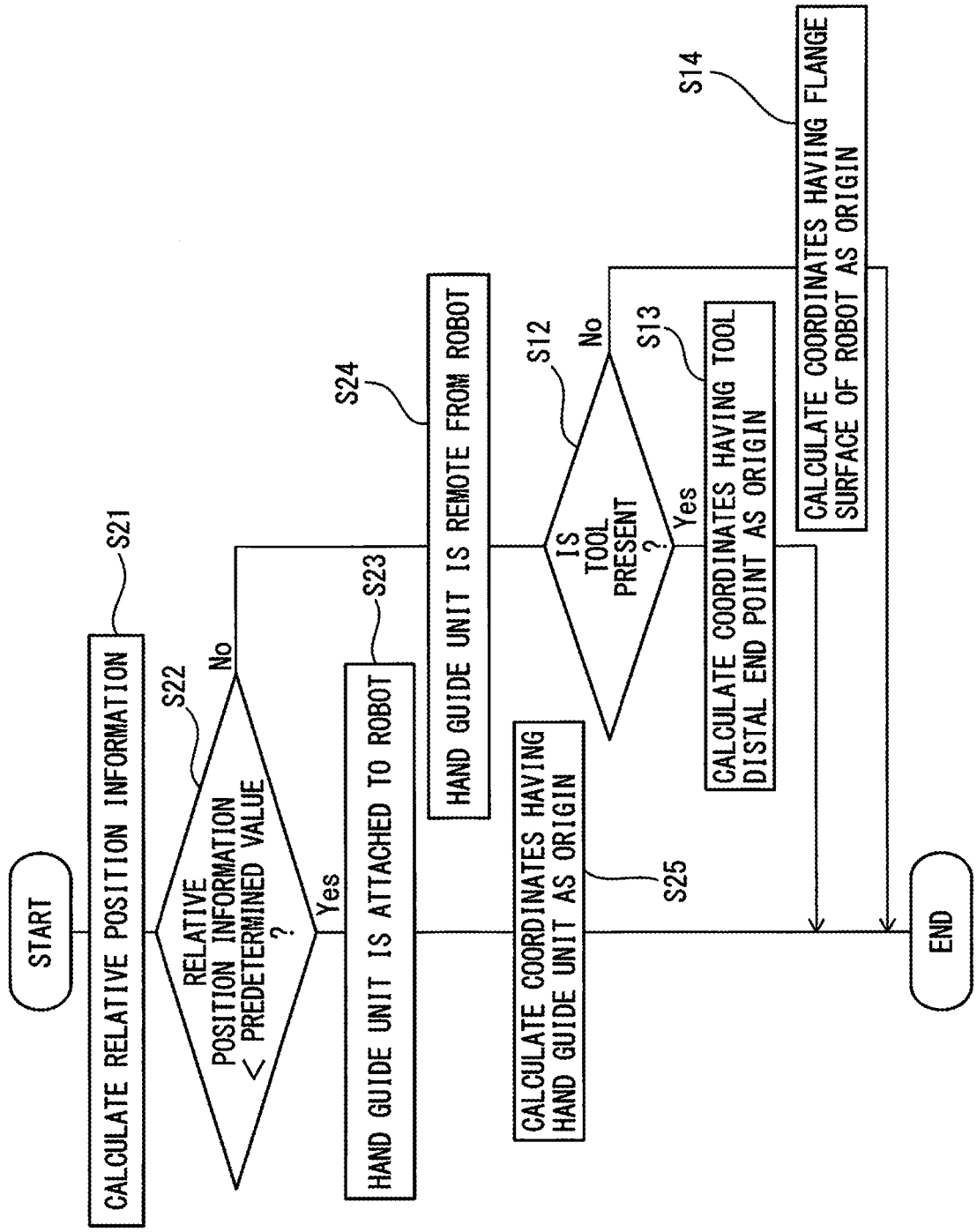
FIG. 6 is a flowchart illustrating an operation of the robot teaching system in the second embodiment.

FIG. 6 is a flowchart illustrating an operation of the robot teaching system in the second embodiment. In the process illustrated in FIG. 6, it is assumed that the wireless communication unit 41 is in such a state as to be wirelessly communicable with the teach pendant 30 or the controller 20.

To start with, in step S21, the relative position setting unit 42 sets relative position information between the hand guide unit 40 and robot 10.

Then, in step S22, the judgment unit 44 compares the relative position information, for example, the relative position, with a predetermined value. The predetermined value is a value which was calculated in advance by experiments, etc., and is set to be smaller than the dimensions of the robot 10. When it is determined that the relative position information is not smaller than the predetermined value, the judgment unit 44 judges that the hand guide unit 40 is located remote from the robot 10 (step S24). In this case, the above-described process is similarly executed in step S12 to step S14.

In contrast, when it is determined that the relative position information is smaller than the predetermined value, the judgment unit 44 judges that the hand guide unit 40 is attached to the robot 10 (step S23). Then, in step S25, the coordinate calculation unit 43 calculates, based on the relative position information, the coordinates ΣH having the hand guide unit 40 as the origin. FIG. 3C illustrates the coordinates ΣH corresponding to the coordinates Σ3 of the hand guide unit 40. In this case, too, the same advantageous effects as described above can be obtained.

Accordingly, as described above, in the coordinates ΣH, the operation direction of the stick 19 in the coordinates Σ3 is reflected so as to become the same direction. Therefore, even when the tool T has a complex shape, the teaching operation of the robot 10 can easily be performed.

Note that in an embodiment not illustrated, the relative position setting unit 42, the coordinate calculation unit 43 and the judgment unit 44 may be included in the teach pendant 30 or the hand guide unit 40. In this case, the CPU of the teach pendant 30 or the CPU of the hand guide unit 40 functions as the relative position setting unit 42, the coordinate calculation unit 43 and the judgment unit 44.

Figure 7:
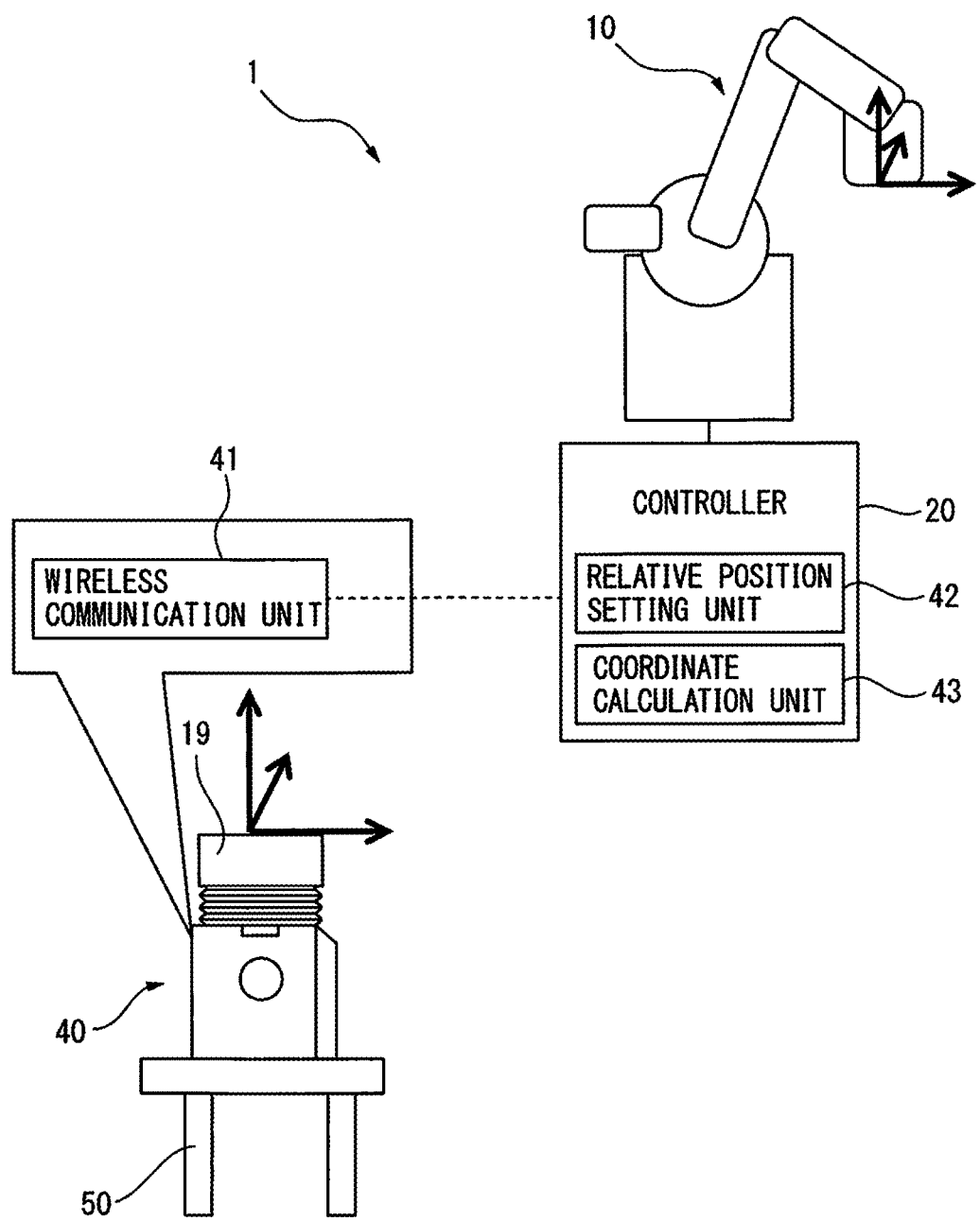
FIG. 7 is a view which is similar to FIG. 1 and illustrates a modification of the first embodiment.
Figure 8:
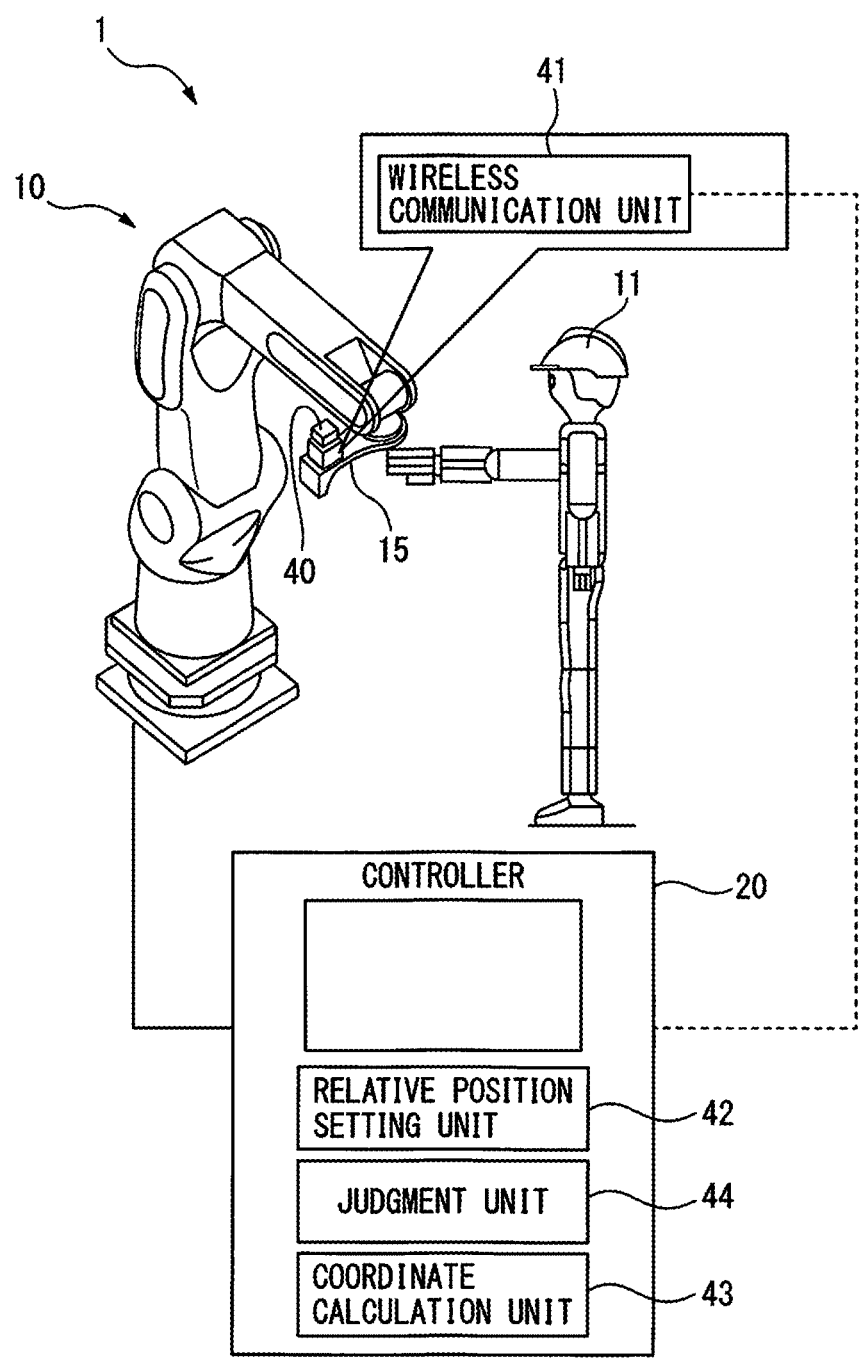
FIG. 8 is a view which is similar to FIG. 5 and illustrates a modification of the second embodiment.

Furthermore, as illustrated in FIG. 7 relating to a modification of the first embodiment and in FIG. 8 relating to a modification of the second embodiment, the robot teaching system 1 may mainly include the robot 10, the controller 20 and the hand guide unit 40. In other words, the robot teaching system 1 may not include the teach pendant 30. In this case, it is assumed that the hand guide unit 40 is connected to the controller 20 by the wireless communication unit 41.

ASPECTS OF THE DISCLOSURE

According to a first aspect, there is provided a robot teaching system (1) including a hand guide unit (40) including a stick (19) for use in a teaching operation of a robot (10), and a wireless communication unit (41) configured to communicate by radio with a controller (20) which controls the robot, or with a teach pendant (30); a relative position setting unit (42) configured to set relative position information between the hand guide unit and the robot; and a coordinate calculation unit (43) configured to calculate, based on the relative position information, coordinates having as an origin a flange surface of the robot or coordinates having as an origin a distal end point of a tool attached to the robot, in such a manner as to correspond to an operation direction of the stick.

According to a second aspect, in the first aspect, the robot teaching system further includes a judgment unit (44) configured to judge, based on the relative position information, whether the hand guide unit is attached to the robot; and a coordinate calculation unit (43) configured to calculate, based on the relative position information, coordinates having as an origin a flange surface of the robot or coordinates having as an origin a distal end point of a tool attached to the robot, in such a manner as to correspond to an operation direction of the stick, when it is judged that the hand guide unit is not attached to the robot by the judgement unit.

According to a third aspect, in the second aspect, when it is judged that the hand guide unit is attached to the robot by the judgement unit, the coordinate calculation unit calculates coordinates having as an origin the hand guide unit, based on position information of the hand guide unit.

According to a fourth aspect, there is provided a controller (20) configured to control a robot (10), the controller including a relative position setting unit (42) configured to set relative position information between a hand guide unit (40) including a stick (19) for use in a teaching operation of the robot, and the robot; and a coordinate calculation unit (43) configured to calculate, based on the relative position information, coordinates having as an origin a flange surface of the robot or coordinates having as an origin a distal end point of a tool attached to the robot, in such a manner as to correspond to an operation direction of the stick.

According to a fifth aspect, in the fourth aspect, the controller further includes a judgment unit (44) configured to judge, based on the relative position information, whether the hand guide unit is attached to the robot, wherein when it is judged that the hand guide unit is not attached to the robot by the judgement unit, the coordinate calculation unit calculates, based on the relative position information, coordinates having as an origin a flange surface of the robot or a distal end point of a tool attached to the robot, in such a manner as to correspond to an operation direction of the stick.

According to a sixth aspect, in the fifth aspect, when it is judged that the hand guide unit is attached to the robot by the judgement unit, the coordinate calculation unit calculates coordinates having as an origin the hand guide unit, based on position information of the hand guide unit.

According to a seventh aspect, there is provided a hand guide unit connected to any one of the controllers of the fourth to sixth aspects.

Advantageous Effects of the Aspects

In the first, fourth and seventh aspects, based on the relative position information, the coordinates are set in such a manner as to correspond to the operation direction of the stick. Accordingly, the robot moves in accordance with the operation direction in which the operator operates the stick. Thus, even when the hand guide unit is detached from the robot, the teaching operation can be performed by radio, while the operator's safety is secured.

In the second and fifth aspects, it is automatically judged whether the hand guide unit is attached to the robot, and then, based on the relative position information, the coordinates are set in such a manner as to correspond to the operation direction of the stick. Accordingly, the robot moves in accordance with the operation direction in which the operator operates the stick. Thus, even when the hand guide unit is detached from the robot, the teaching operation can be performed by radio, while the operator's safety is secured.

In the third and sixth aspects, even when a tool of a complex shape is attached to the robot, the teaching operation can easily be performed based on the coordinates having the hand guide unit as the origin.

The embodiments of the present invention have been described above. As is understood by a skilled person, various modifications and changes can be made without departing from the scope of the disclosure in patent claims which will follow.

The invention claimed is:

1. A robot teaching system, comprising:
   a hand guide unit including a stick for use in a teaching operation of a robot, and a wireless communication unit configured to communicate by radio with a controller which controls the robot, or with a teach pendant;
   a relative position setting unit configured to set relative position information between the hand guide unit and the robot;
   a coordinate calculation unit configured to calculate, based on the relative position information, coordinates having as an origin a distal end point of a tool attached to the robot, in such a manner as to correspond to an operation direction of the stick; and
   a judgment unit configured to compare a relative position in the relative position information with a predetermined value, and judge whether the hand guide unit is attached to the robot;
   wherein, in response to the relative position being less than the predetermined value and a judgement by the judgment unit that the hand guide unit is attached to the robot,
      the coordinate calculation unit is configured to calculate coordinates having as an origin the hand guide unit, based on position information of the hand guide unit.

2. The robot teaching system according to claim 1,
   wherein in response to the relative position being not less than the predetermined value and a judgement by the judgment unit that the hand guide unit is not attached to the robot,
      the coordinate calculation unit is configured to calculate, based on the relative position information, coordinates having as an origin a flange surface of the robot or the distal end point of the tool attached to the robot, in such a manner as to correspond to the operation direction of the stick.

3. A controller for controlling a robot, the controller comprising:
   a relative position setting unit configured to set relative position information between a hand guide unit including a stick for use in a teaching operation of the robot, and the robot;
   a coordinate calculation unit configured to calculate, based on the relative position information, coordinates having as an origin a distal end point of a tool attached to the robot, in such a manner as to correspond to an operation direction of the stick; and
   a judgment unit configured to compare a relative position in the relative position information with a predetermined value, and judge whether the hand guide unit is attached to the robot;
   wherein, in response to the relative position being less than the predetermined value and a judgement by the judgment unit that the hand guide unit is attached to the robot,
      the coordinate calculation unit calculates coordinates having as an origin the hand guide unit, based on position information of the hand guide unit.

4. The controller according to claim 3,
   wherein in response to the relative position being not less than the predetermined value and a judgement by the judgment unit that the hand guide unit is not attached to the robot,
      the coordinate calculation unit is configured to calculate, based on the relative position information, coordinates having as an origin a flange surface of the robot or the distal end point of the tool attached to the robot, in such a manner as to correspond to the operation direction of the stick.

5. A system, comprising:
   a hand guide unit; and
   a robot controller configured to control a robot and connected to the hand guide unit, wherein the robot controller comprises:
   a relative position setting unit configured to set relative position information between the hand guide unit including a stick for use in a teaching operation of the robot, and the robot; and
   a coordinate calculation unit configured to calculate, based on the relative position information, coordinates having as an origin a distal end point of a tool attached to the robot, in such a manner as to correspond to an operation direction of the stick; and
   a judgment unit configured to compare a relative position in the relative position information with a predetermined value, and judge whether the hand guide unit is attached to the robot;
   wherein, in response to the relative position being less than the predetermined value and a judgement by the judgment unit that the hand guide unit is attached to the robot,
      the coordinate calculation unit calculates coordinates having as an origin the hand guide unit, based on position information of the hand guide unit.

6. The system according to claim 5,
   wherein in response to the relative position being not less than the predetermined value and a judgement by the judgment unit that the hand guide unit is not attached to the robot,
      the coordinate calculation unit is configured to calculate, based on the relative position information, coordinates having as an origin a flange surface of the robot or the distal end point of the tool attached to the robot, in such a manner as to correspond to the operation direction of the stick.

\* \* \* \* \*